United States Patent
Herber et al.

(10) Patent No.: US 11,676,045 B2
(45) Date of Patent: Jun. 13, 2023

(54) NETWORK NODE WITH RECONFIGURABLE RULE-BASED ROUTING

(71) Applicant: NXP B.V., Eindhoven (NL)

(72) Inventors: Christian Herber, Hamburg (DE); Thierry G. C. Walrant, Bouge (BE)

(73) Assignee: NXP B.V., Eindhoven (NL)

( * ) Notice: Subject to any disclaimer, the term of this patent is extended or adjusted under 35 U.S.C. 154(b) by 389 days.

(21) Appl. No.: 16/843,731

(22) Filed: Apr. 8, 2020

(65) Prior Publication Data
US 2020/0334548 A1    Oct. 22, 2020

(30) Foreign Application Priority Data

Apr. 16, 2019  (EP) ..................... 19169399

(51) Int. Cl.
*G06N 5/025* (2023.01)
*B60W 50/14* (2020.01)
*H04L 45/64* (2022.01)
*H04L 45/74* (2022.01)
*H04L 47/10* (2022.01)
*H04L 47/50* (2022.01)
*H04L 9/40* (2022.01)

(52) U.S. Cl.
CPC ............. *G06N 5/025* (2013.01); *B60W 50/14* (2013.01); *H04L 45/64* (2013.01); *H04L 45/74* (2013.01); *H04L 47/10* (2013.01); *H04L 47/50* (2013.01); *H04L 63/04* (2013.01)

(58) Field of Classification Search
None
See application file for complete search history.

(56) References Cited

U.S. PATENT DOCUMENTS

| | | |
|---|---|---|
| 9,967,257 B2 | 5/2018 | Balmakhtar et al. |
| 10,069,844 B2 | 9/2018 | Paczkowski et al. |
| 10,237,274 B2 | 3/2019 | Balmakhtar et al. |

(Continued)

FOREIGN PATENT DOCUMENTS

| | | |
|---|---|---|
| WO | 2018019370 A1 | 2/2018 |
| WO | 2018077376 A1 | 5/2018 |

OTHER PUBLICATIONS

"OpenFlow Swtich Specification—Version 1.5.1 (Protocol version 0x06)", Open Networking Foundation, Open Flow, 283 pgs. (2015).

(Continued)

*Primary Examiner* — Anh Ngoc M Nguyen (57) ABSTRACT

A network node comprising:
a message handling module configured to control the sending of messages to one or more output ports of the network node based on a rule set stored at the network node, the rule set comprising one or more rules;
a communication module configured to receive at least one update to the rule set from a controller node, separate from the network node, for changing the rule set;
a supervisor module configured to verify that the changes to the rule set instructed by the update comply with at least a first set of rule-compliance-criteria and, if so, the network node is configured to modify the rule set to implement the changes of the update and, if not, the network node is configured not to implement the changes to the rule set.

13 Claims, 3 Drawing Sheets

(56) References Cited

U.S. PATENT DOCUMENTS

| | | | |
|---|---|---|---|
| 2009/0217341 A1* | 8/2009 | Sun | H04L 63/1416 |
| | | | 726/1 |
| 2017/0054609 A1* | 2/2017 | Chetan | H04L 43/022 |
| 2018/0248755 A1* | 8/2018 | Hecker | H04L 45/38 |
| 2019/0158505 A1 | 5/2019 | An et al. | |
| 2021/0163017 A1* | 6/2021 | Fredman | G08G 1/16 |

OTHER PUBLICATIONS

Badra, M. "NETCONF over Transport Layer Security (TLS)", CNRS/LIMOS Laboratory, 7 pgs., retrieved from the internet Apr. 7, 2020 at: https://tools.ietf.org/pdf/rfc5539.pdf (May 2009).

Son, S. et al. "Model Checking Invariant Security Properties in OpenFlow", IEEE ICCC 2013—Communication and Information Systems Security Symposim, pp. 1974-1979 (2013).

Tseng, Y. et al. "SRV: Switch-based Rules Verification in Software Defined Networking", 2016 IEEE NetSoft Conference and Workshops, pp. 478-482 (2016).

* cited by examiner

NETWORK NODE WITH RECONFIGURABLE RULE-BASED ROUTING

CROSS-REFERENCE TO RELATED APPLICATIONS

This application claims the priority under 35 U.S.C. § 119 of European patent application no. 19169399.3, filed on Apr. 16, 2019, the contents of which are incorporated by reference herein.

FIELD

The present disclosure relates to a network node. In particular, it relates to a network node that provides for sending of messages, which may include the modification or forwarding of messages, based on a rule set established by a different network node. The present disclosure also relates to a network including such a network node and an associated method.

BACKGROUND

Centralised network technologies may be advantageous in terms of control of the sending of messages by network nodes. However, the security of the network is also important.

SUMMARY

According to a first aspect of the present disclosure there is provided a network node comprising:
- a message handling module configured to control the sending of messages to one or more output ports of the network node based on a rule set stored at the network node, the rule set comprising one or more rules;
- a communication module configured to receive at least one update to the rule set from a controller node, separate from the network node, for changing the rule set;
- a supervisor module configured to verify that the changes to the rule set instructed by the update comply with at least a first set of rule-compliance-criteria and, if so, the network node is configured to modify the rule set to implement the changes of the update and, if not, the network node is configured not to implement the changes to the rule set.

In one or more embodiments, the communication module comprises a software defined networking, SDN, agent.

In one or more embodiments, the control of the sending of the one or more messages comprises one or more of:
- control of forwarding of one or more messages generated at the network node to at least one of the one or more output ports based on one or more forwarding rules of the rule set;
- control of forwarding of one or more messages received at one or more input ports of the network node to one of the one or more output ports based on one or more forwarding rules of the rule set;
- control of flow of the one or more messages based on one or more bandwidth rules of the rule set;
- control of addressing of the one or more messages based on one or more addressing rules of the rule set;
- control of scheduling of the forwarding of the one or more messages based on one or more scheduling rules of the rule set; and
- control of the formatting or content of the one or more messages based on one or more modification rules.

In one or more embodiments, the rule set is exclusively determined by the controller node.

In one or more embodiments, the changes to the rule set defined by the update comprise one or more of:
- replacement of one or more of the rules of the rule set;
- addition to the rules of the rule set; and
- removal of one or more of the rules of the rule set.

In one or more embodiments, the communication module is configured to establish a secure communication channel between the network node and the controller node for the receipt of the at least one update to the rule set.

In one or more examples, the rule-compliance-criteria comprises criteria that the rules of the update must satisfy to be considered to comply.

In one or more examples, the rule-compliance-criteria comprises criteria that the rules of the update must not contravene to be considered to comply.

In one or more examples, the rule-compliance-criteria comprises criteria that the rules of the rule set must meet collectively to be considered to comply should the changes of the update be implemented.

In one or more examples, the supervisor module comprises one of software executed by a processor of the network node or hardware of the network node.

In one or more embodiments, the network node is configured to receive the rule-compliance-criteria by a process that verifies the authenticity of the rule-compliance-criteria. In one or more examples, the process may comprise a secure boot process.

In one or more embodiments, the supervisor module is configured to verify the changes to the rule set instructed by the update comply with at least a first set of rule-compliance-criteria followed by a second set of rule-compliance-criteria or the second set of rule-compliance-criteria followed by the first set of rule-compliance-criteria, wherein
- the first set of rule-compliance-criteria comprise criteria that must not be contravened (WSC); and
- the second set of rule-compliance-criteria comprise criteria that must be met (NSC).

In one or more embodiments, the first set of rule-compliance-criteria at least comprises criteria that defines where the one or more messages forwarded by the message handling module should not be sent.

In one or more embodiments, the second set of rule-compliance-criteria comprises criteria that defines where the one or more messages forwarded by the message handling module must be sent.

In one or more examples, the first set of rule-compliance-criteria comprises criteria that define a security threat to a network to which the network node forms part. In one or more examples, the second set of rule-compliance-criteria comprises criteria that defines one or more rules of the rule set are required for the operation of the network to which the network node forms part.

In one or more embodiments, based on determination that the changes to the rule set instructed by the update do not comply with the at least first set of rule-compliance-criteria, the network node is configured send a warning message indicative of the update not complying with the rule-compliance-criteria.

In one or more examples, the warning message may be sent to an entity that is configured to monitor the security of a network of which the network node and controller node is part.

According to a second aspect of the present disclosure there is provided a network comprising:
- a controller node; and
- a plurality of network nodes according to any preceding claim, wherein the output ports of each of network nodes provides a communication channel to another one of the plurality of network nodes or the centralized network controller.

In one or more embodiments, the network comprises a network of an automobile and at least one of the plurality of network nodes comprise a driver assistance system.

According to a third aspect of the present disclosure there is provided a method comprising:
- controlling the sending of messages to one or more output ports of the network node based on a rule set stored at the network node, the rule set comprising one or more rules;
- receiving at least one update to the rule set from a controller node, separate from the network node, for changing the rule set;
- verifying that the changes to the rule set instructed by the update comply with at least a first set of rule-compliance-criteria and, if so, modifying the rule set to implement the changes of the update and, if not, not implementing the changes to the rule set.

In one or more embodiments, sending a warning message indicative of the update not complying with the rule-compliance-criteria based on a determination that the changes to the rule set instructed by the update do not comply with the at least first set of rule-compliance-criteria.

It will be appreciated that the optional features of the first aspect may be performed by the method of the third aspect.

According to a fourth aspect of the present disclosure there is provided an automobile comprising the network of the second aspect.

In a further aspect of the disclosure there is provided a network node comprising a processor, the processor configured to:
- control the sending of messages to one or more output ports of the network node based on a rule set stored at the network node, the rule set comprising one or more rules;
- receive at least one update to the rule set from a controller node, separate from the network node, for changing the rule set; and
- verify that the changes to the rule set instructed by the update comply with at least a first set of rule-compliance-criteria and, if so, the network node is configured to modify the rule set to implement the changes of the update and, if not, the network node is configured not to implement the changes to the rule set.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Networks may be of a type in which the control of the routing of messages over network nodes of the network and the forwarding of messages by those network nodes is centralized at a controller node, which may comprise a centralized network controller (CNC) node. The CNC node can dynamically configure the network to meet different use-case scenarios, adapt the network in failure scenarios, and perform allocation of resources to dynamic application requirements. Software-defined Networking (SDN), among other examples, is a technology that provides for such centralized control. SDN networks may use protocols such as OpenFlow, netconf or restconf to configure the network. While SDN networks may traditionally utilize a node termed a "centralized network controller", it will be appreciated that use of the term herein is not limited to SDN type networks.

The ability of the CNC to reconfigure the entire network makes it a valuable target for remote attackers. State-of-the-art SDN configuration protocols like OpenFlow, netconf, restconf, etc. all mandate the use of secure transport protocols, typically TLS, to establish trust between the CNC and the network nodes that are to be reconfigured by the CNC. This secure communication may protect against the introduction of a phony CNC into the network but it does not provide security for all threats, such as when the CNC may have been compromised by an attacker.

Such centralized networks may have application in the field of automotive based networks. Automotive based networks may provide a variety functionality, such as engine management functionality, advanced driver assistance systems (ADAS), such as automatic braking, lane departure warning, self-driving capability, self-parking capability or engine/motor/battery diagnostic functions. In one or more examples, the network nodes may each perform one or more functions or acquire or forward data for said one or more functions or function(s) of other network nodes to be performed.

In automotive based networks, each network element may be configured to have a degree of responsibility for its security to reduce single points of failure. Therefore, each network node may implement a secure boot mechanism which checks the authenticity of firmware or software executed by the network node or the configuration of the network node. The authenticity is guaranteed by a root of trust in the network node, with the firmware being signed in a secure back-end facility. Allowing a potentially compromised CNC to modify such configuration data would undermine the security established by secure boot. Thus, one or more examples described herein relate to checking the changes instructed by a CNC. The examples may provide the advantages of a centralized network controller for flexibility and manageability but may ensure the network nodes are secure independent of the security of the centralized network controller.

Figure 1:
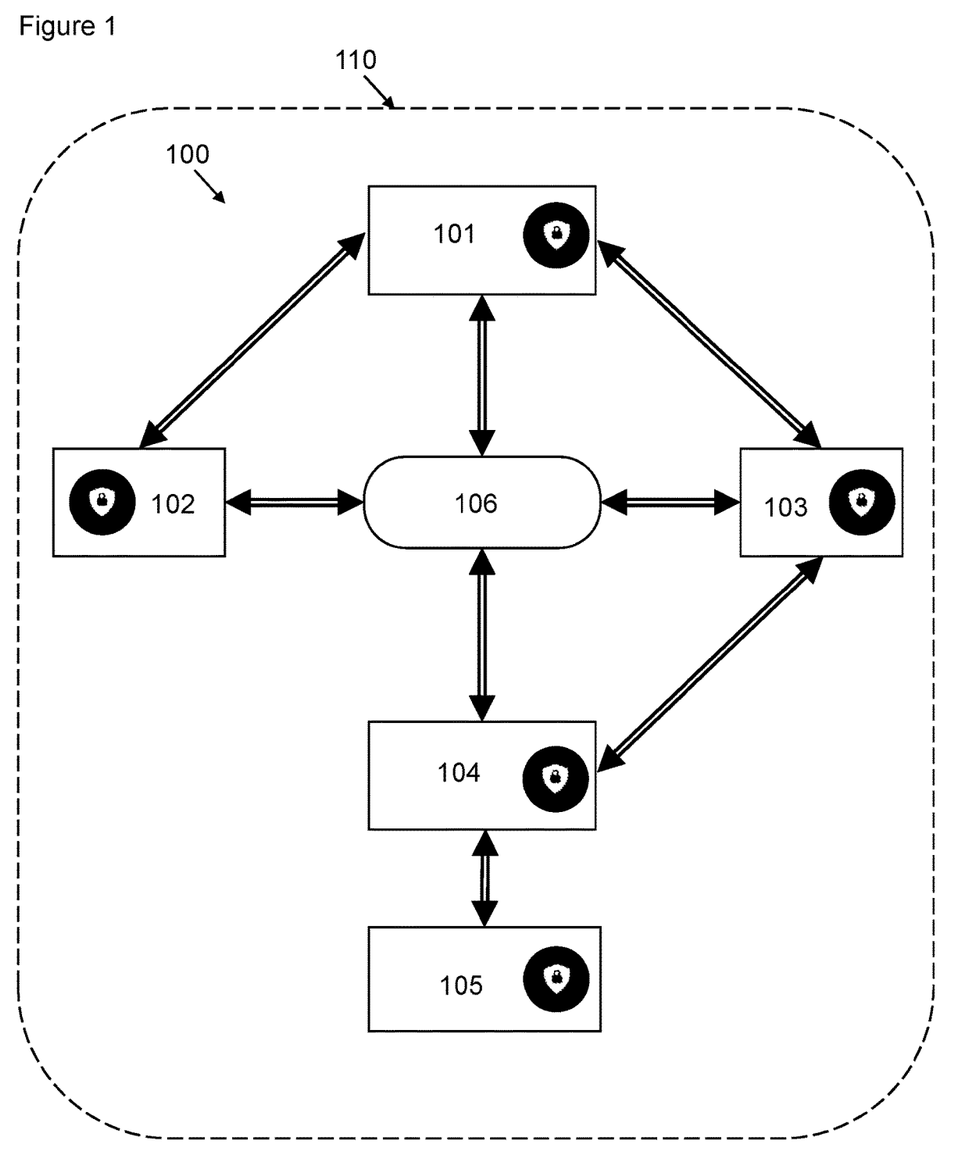
FIG. 1 shows an example embodiment of a network including a plurality of network nodes and a controller node.

Example FIG. 1 shows an example network 100 comprising a plurality of network nodes comprising first to fifth network nodes 101, 102, 103, 104, 105 and a controller node 106. In the description that follows the controller node may be referred to as a centralized network controller node 106, although it will be appreciated that in other examples, the controller node 106 may or may not be SDN based and may, in one or more examples, comprise a server physically remote from the network 100. The networks nodes 101-105 may be arranged in a variety of topologies, such as a star topology with the centralized network controller 106 at the centre or as a mesh topology, among others. In this example, the first network node 101 has a connection directly to the second network node 102, the third network node 103 and the CNC 106. The third network node 103 has a connection directly to the CNC 106 and the fourth network node 104. The first to fourth network nodes 101, 102, 103, 104 all have a connection directly to the CNC 106. The fifth network node connected to the fourth network node 104. It will be appreciated that the connections depicted are not limiting and provide an example network for further discussion.

The network 100 may comprise a network of an automobile 110 as mentioned above. Thus, the network nodes 101-105 may be configured to perform different functions for the automobile to function, such as driver assistance systems, also known as advanced driver assistance systems (ADAS), engine management, battery management or traction motor management, among other example functions. Accordingly, each network node may comprise a processor having memory or a microcontroller or a FPGA or the like that may be configured to host and execute the functionality provided by the network node. In one or more examples, one or more of the network nodes may be configured to host a virtual machine that performs particular functionality, as exemplified herein. In one or more examples, the network node may be configured to host one or more virtual machines. This may be advantageous because if one network node fails, a virtual machine that provides the lost functionality may be executed by a different network node. In one or more examples, the network nodes may be preloaded with one or more backup virtual machines to provide redundancy for corresponding active virtual machines executed at other network nodes. Thus, if a network node is lost, a corresponding backup virtual machine can be made the active virtual machine for the lost functionality. The CNC 106 may then cause the routing and forwarding of messages required for the lost functionality to the network node that now hosts the virtual machine.

In summary, each network node 101-105 may locally store a rule set that defines where and/or how it should send messages to the other network nodes 101-105 or CNC 106. The rule set may comprise one or more rules. The rules may each relate to a different type or class of message. The type of a message may be defined by the content of the message, such as data content or where the message should be forwarded, which may be determined from an address of the message or any other field in the message, or from which network node the message originates. A plurality of rules may form a series of logic that is used to determine how or when the network node should send a message.

Figure 2:
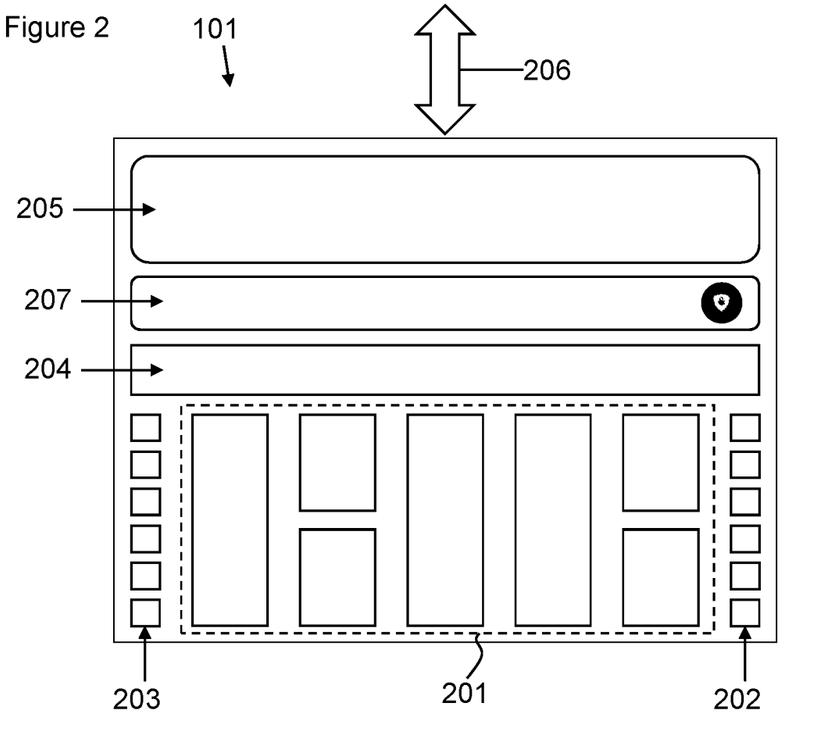
FIG. 2 shows an example embodiment of a network node.

Example FIG. 2 shows an example functional structure of the network nodes 101-105. It will be appreciated that the functional blocks described below are to aid understanding and the physical arrangement of the hardware of network node may or may not be consistent with the functional block description herein. For example, the functional blocks may be embodied as hardware and there may or may not be separate hardware components that perform the function of the functional blocks as arranged in the example herein. The functional blocks may be embodied as software and there may be one or more processors to execute the software. The software itself may or may not be separated into code that performs the function of the functional blocks as arranged in the example herein.

Although example FIG. 2 represents any one of the network nodes 101-105, the network node of FIG. 2 will be referred to as network node 101 for simplicity. The network node 101 comprises a message handling module 201 configured to control the sending of messages to one or more output ports 202 of the network node. The one or more output ports may provide access to a respective one or more communication channels to different network nodes. The output ports 202 may comprise ethernet ports, although other network technologies may be used. The message handling module 201 is configured to control the sending of messages to the one or more output ports 202 based on a rule set 204 stored at the network node 201, the rule set comprising the one or more rules.

The control of the sending of the one or more messages may comprise control of one or more of the forwarding, flow (e.g. minimum or maximum rate of sending a plurality of messages, and which may also include policing or shaping), addressing or temporal scheduling of the sending of messages or the counting of messages. The control of the sending of the messages across one or more of the network nodes may provide for control of routing of the messages in the network. Thus, the control may comprise control of where the message are to be sent and how they should be sent and, in one or more examples, whether or not the messages are to be sent. For example, the rules of rule set may define how the message handling module 201 or, more generally, the network node 101, should control the forwarding of one or more messages generated at the network node 101 to the one or more output ports 202. The rules of the rule set related to the forwarding of messages to a selected port of a plurality of output ports may be termed forwarding rules. Thus, the message handling module 201 may forward messages generated at the network node 101 based on the one or more forwarding rules of the rule set. In one or more examples, the rules of the rule set may comprise a mapping between the type of message generated at the network node and one or more output ports 202. For example, the network node 101 may be configured to generate two types of message, one of which may be for forwarding to an engine management unit hosted at one of the other network nodes and the other of which may be for forwarding to an automotive traction control unit hosted at a different one of the other nodes. The message handling module 201 may be configured to determine the message type and then, based on the one or more forwarding rules, determine to which of the output ports 202 the message should be forwarded.

The rules of rule set 204 may define how the message handling module 201 or, more generally, the network node 101, should control the forwarding of one or more messages received at one or more input ports 203 of the network node 101 to the one or more output ports 202. Thus, the message handling module 201 may forward messages received by the network node 101 to other network nodes based on the one or more forwarding rules of the rule set. For example, a message from the third network node 103 may be received at a particular one of the input ports 203. The one or more forwarding rules may state that messages received at said particular one of the input ports 203 should be forwarded to a particular one of the output ports 202, such that the message can reach the second network node 102. Thus, in one or more examples, the rules of the rule set may comprise mappings between one or more input ports 203 and one or more output ports 202.

The rules of rule set 204 may define how the message handling module 201 or, more generally, the network node 101, should control the flow of the one or more messages. Thus, messages of the network node may contain information that may be required at a different network node at least at a minimum threshold rate. In other examples, the other network node may require the message not to be received above a maximum threshold rate. Thus, the message handling module 201 may control the flow of messages, such as to a particular destination network node, based on one or more bandwidth rules of the rule set.

The rules of rule set 204 may define how the message handling module 201 or, more generally, the network node 101, should control the addressing of the one or more messages. Thus, the one or more messages may be for receipt by a virtual machine hosted on one of the other network nodes and the rules of the rule set may define a MAC address or other network node-specific address to use to send the message to the network node that hosts the virtual machine. Thus, the message handling module 201 may control the addressing of messages based on one or more addressing rules of the rule set. The addressing rules may relate to addressing between network-node specific addresses (e.g. between two layer 2 addresses); between network-node specific addresses and functionality specific addresses hosted by the network nodes (e.g. between layer 2 and layer 3 addresses); or between functionality specific addresses hosted by the network nodes (e.g. between two layer 3 addresses). The addressing rules may relate to information included in layer 4 information and higher OSI layers.

The rules of rule set may define how the message handling module 201 or, more generally, the network node 101, should control the scheduling of the forwarding of the one or more messages. Thus, in one or more examples, the delivery of one or more messages over the network 100 may be time-sensitive, such as for real-time computing purposes or to meet time constraints inherent in a communication protocol. The message handling module 201 may control the timing or scheduling of the sending of a message or priority given to some messages over others based on one or more scheduling rules of the rule set.

The rules of the rule set 204 may define how the message handling module 201 or, more generally, the network node 101, should control the redundancy of the messages.

The rules of rule set may define how the message handling module 201 or, more generally, the network node 101, should control the formatting or content of the one or more messages based on one or more modification rules. Thus, in one or more examples, the message handling module 201 may control frame modification, where the messages are formed as frames, prior to forwarding the one or more messages, such as by pushing and/or popping VLAN (Virtual Local Area Network) headers or tags.

The network node 101 may further comprise a communication module 205 configured to receive at least one update to the rule set 204 from the controller node 106 via communication channel 206 for changing the rule set 204. If the network 100 implements SDN network technology, then the communication module 205 may be considered to comprise an SDN agent configured to receive said update on a southbound SDN interface 206. In one or more examples, such as when the network is not SDN based, the network node 101 may include the communication module 205 to receive at least one update to the rule set 204 from a server via communication channel 206 for changing the rule set 204. Thus, in such an example, the CNC 106 may comprise a server that is in communication with the network node 101 via the communication module 205, in which the module 205 may provide a connection to the Internet for communicating with the server.

The update may take different forms and may comprise a replacement rule set for replacing the current rule set. In one or more examples, the update may comprise one or more rules configured to replace one or more current rules of the rule set 204. Alternatively, the update may comprise instructions to modify one or more existing rules thereby replacing an existing rule with a new rule. In one or more examples, the update may comprise one or more rules configured to be added to the one or more current rules of the rule set 204. In one or more examples, the update may comprise instructions to delete one or more current rules of the rule set 204. It will be appreciated that the CNC 106, in one or more examples, may be configured to store a copy of the rule set 204 of the network node 101.

In this example, the rule set 204 is exclusively determined by the centralized network controller node 106 rather than the network node 101. However, in other examples, the network node 101 may have limited or full control over the setting of rules of the rule set in addition to the CNC 106.

The communication module 205 may be configured to establish a secure communication channel 206 between the network node 101 and the centralized network controller node 106 for the receipt of the at least one update to the rule set. The secure communication channel may use Transport Layer Security (TLS) protocols or any other secure symmetric cryptographic methods or public/private key cryptographic methods.

The network node 101 may advantageously comprise a supervisor module 207 configured to verify that the changes to the rule set instructed by the update comply with at least a first set of rule-compliance-criteria. The supervisor module 207 may be considered to comprise a distributed layer of security for the network 100 to check for prohibited behaviour of the CNC 106. The rule-compliance-criteria may comprise a criterion or list of criteria that individual rules of the rules set must satisfy or combinations of the rules must satisfy. The rule-compliance-criteria may be pre-stored information of the network node 101, such as pre-stored at the time of manufacture or commissioning. The integrity of the rule-compliance-criteria is important and accordingly it may be stored securely at the network node 101. The network node 101 may be configured to receive the rule-compliance-criteria by a secure boot process to guarantee the integrity of the rule-compliance-criteria.

The supervisor module 207 may be configured to provide for compliance of one or more updates during operation of the network node. If the update or rules thereof comply with the rule-compliance-criteria, the network node 101 is configured to modify the rule set 204 to implement the changes of the update. If the update or rules thereof do not comply with the rule-compliance-criteria, the network node 101 is configured not to implement the changes to the rule set. In one or more examples, where the update may comprise a plurality of different changes, then some of those changes may comply with the rule-compliance-criteria and others may not comply with the rule-compliance-criteria. Accordingly, in one or more examples, where the update may comprise a plurality of different changes, the network node 101 may be configured to implement only those changes to the rule set that comply with the rule-compliance-criteria.

The rule-compliance-criteria may be defined in many different ways. For example, the rule-compliance-criteria may specify that messages received from a particular network node 101-105 may only be forwarded to a subset of the other network nodes. Thus, if the CNC attempts to change the rule set to send the messages to a network node outside said subset, the supervisor module 207 will prevent those changes being implemented. As a practical example, the rule-compliance-criteria may specify that messages that originate from a network node providing modem functionality may not be forwarded to a network node responsible for engine management because it may be deemed that it is a safety risk that signalling originating external to the automobile may be used to control the engine. In another example, the rule-compliance-criteria may specify that a network node that provides self-driving functionality must receive messages from a network node that acquires radar data at a minimum threshold rate because below that minimum threshold rate the effectiveness of the self-driving functionality may be compromised. Thus, if the update from the CNC 106 attempts to control the message flow rate below the minimum threshold rate, then the supervisor module 207 may not implement the change of the update.

In one or more examples, the rule-compliance-criteria comprises criteria that the rules of the update must satisfy to be considered to comply. Thus, rule-compliance-criteria of this form may be considered to define a minimum level of functionality of the network nodes 101-106 of the network 100 in order for the network 100 to perform effectively or functionality deemed compulsory for operation of the network 100.

In one or more examples, the rule-compliance-criteria comprises criteria that the rules of the update must not contravene to be considered to comply. Thus, rule-compliance-criteria of this form may be considered to define ways of controlling the sending of messages that may represent a security threat.

It will be appreciated that individual rules of the rule set 204 may, by themselves, not be considered a security threat, although combinations of rules may be a security threat. Thus, in one or more examples, the rule-compliance-criteria may comprise criteria that the rules of the rule set must meet collectively to be considered to comply if the changes defined in the update were to be applied to the rule set 204. The supervisor module 207 may therefore determine a test rule set based on a current rule set 204 with the changes of the update made. The test rule set may then be considered in view of the rule-compliance-criteria to determine compliance.

The supervisor module 207 may be logically located between where the rule set 204 is stored and the communication module 205 that receives the update to prevent the actions of the supervisor module 207 being subverted.

Figure 3:
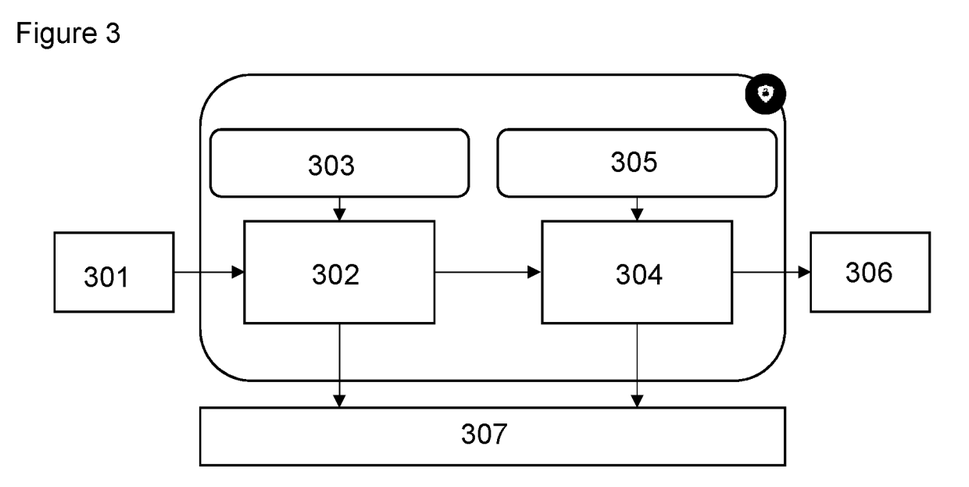
FIG. 3 shows an example process followed by a supervisor module of the network node.

Example FIG. 3 shows an example process followed by a supervisor module 207 of the network node. In this example there is at least two sets of rule-compliance-criteria. The supervisor module 207 may therefore be configured to verify the changes to the rule set 204 instructed by the update comply with at least a first set of rule-compliance-criteria followed by a second set of rule-compliance-criteria or the second set of rule-compliance-criteria followed by the first set of rule-compliance-criteria.

The first set of rule-compliance-criteria may comprise criteria that must not be contravened. The first set of rule-compliance-criteria may comprise the most permissive configuration of the rule set that is possible that does not contravene a fundamental set of security-based requirements. In one or more examples, the first set of rule-compliance-criteria may be termed the Widest Secure Configuration (WSC). In one or more examples, the first set of rule-compliance-criteria may at least comprise a criterion or criteria that defines where messages forwarded by the message handling module 201 should not be sent or how they should not be sent.

The second set of rule-compliance-criteria may comprise criteria that must be met. The second set of rule-compliance-criteria may comprise the most restrictive configuration of the rule set that is possible that still provides for compulsory functionality or a minimum level of functionality of the network 100. The minimum level of functionality will vary depending on the field to which the network is applied. However, in one or more examples, it may be considered to define one or more of forwarding rules, bandwidth rules or scheduling rules that must be present, such as for at least one of the network nodes to perform its intended function. In one or more examples, the second set of rule-compliance-criteria may be termed the Narrowest Secure Configuration (NSC). In one or more examples, the second set of rule-compliance-criteria may comprise a criterion or criteria that defines where messages forwarded by the message handling module must be sent, such as at least to a defined subset of network nodes.

In one or more examples, the rule-compliance-criteria comprise one or more of:
   criteria that defines one or more output ports or other network nodes to which messages must or must not be forwarded by the message handling module;
   criteria that defines a lower bandwidth limit or upper bandwidth limit for messages forwarded to one or more of the one or more output ports or another network node by the message handling module;
   criteria that defines to which network nodes messages may or may not be addressed; and
   criteria that defines a maximum time that may elapse before a message is sent.

With reference to example FIG. 3, the update may be received at 301. A decision block 302 may receive the update 301 along with the first set of rule-compliance-criteria from block 303. If the update complies with the first set of rule-compliance-criteria, the process continues to the decision block 304 which receives the update and the second set of rule-compliance-criteria from block 305. If the update complies with the second set of rule-compliance-criteria, the process proceeds to block 306 at which the rule set 204 is updated in accordance with the update. If at decision block 302 or 304, the update does not comply with the respective first and second sets of rule-compliance-criteria, then the update is rejected at block 307.

In one or more examples, block 307 may also represent the network node being configured to send a warning message indicative of the update not complying with the rule-compliance-criteria. The warning message may be sent to an entity that is configured to monitor the security of a network 100 of which the network node 101 and centralized network controller node 106 is part. The entity may comprise a network hypervisor or a hypervisor of the CNC 106. The warning message may be configured to elicit control of the CNC 106 to restore it to a non-compromised state from a potentially compromised state. The sending of the warning message may be implemented in other examples, irrespective of whether they are SDN based, with at least one set of rule-compliance-criteria.

Figure 4:
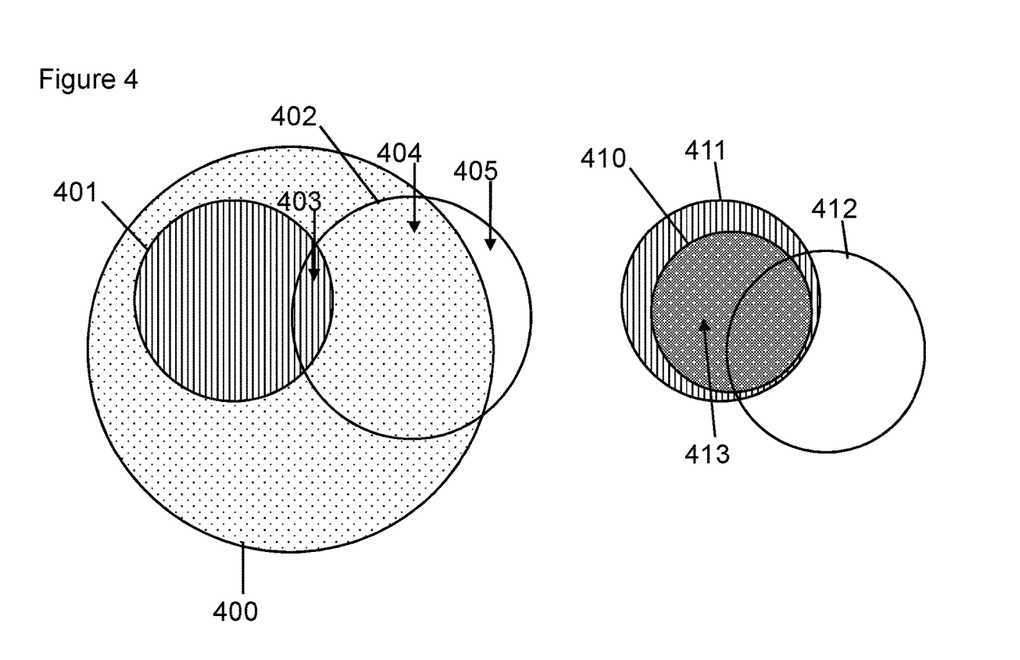
FIG. 4 shows an example of a first set of rule-compliance-criteria and a second set of rule-compliance-criteria.

Example FIG. 4 shows an example of a first set of rule-compliance-criteria and a second set of rule-compliance-criteria relative to a potential update in the form of a Venn diagram.

Circle 400 may represent the first set of rule-compliance-criteria. Circle 401 may represent the current rule set, which is one that complies with the first set of rule-compliance-criteria 400 and, as such, is wholly contained within circle 400. Circle 402 represents an update. The circle 402 has a part 403 that overlaps with the circle 401, that may indicate some of the rules of the update are common to the rules of the current rule set; a part 404 that is within the circle 400, that may represent some of the rules of the update comply with the first set of rule-compliance-criteria along with those in part 403; and a part 405. The part 405 is outside the circle 400 and therefore represent rules of the update that do not comply with the first set of rule-compliance-criteria. Thus, the update may be deemed not to comply with the first set of rule-compliance-criteria because of the presence of part 405 outside the circle 400.

Circle 410 may represent the second set of rule-compliance-criteria. Circle 411 may represent the current rule set, which is one that complies with the second set of rule-compliance-criteria 410 and, as such, is a superset of circle 410 and wholly contains the circle 410. Circle 412 represents an update. The circle 412 does not include part 413 of the second set of rule-compliance-criteria 410 and therefore the update does contain all of the rules required to meet the minimum/compulsory requirements established by the second set of rule-compliance-criteria. Thus, the update may be deemed not to comply with the second set of rule-compliance-criteria.

In summary, the update must comprise both a subset of the first set of rule-compliance-criteria and a superset of the second set of rule-compliance-criteria in order to comply and be accepted by the supervisor module 207.

As a practical example of the operation of the network node we may assume that there is a degraded link in the network 100 that requires reconfiguration be the CNC 106. Accordingly, the CNC may redirect the sending of one or more messages by the network node 101 to a different one of the output ports. For example, network node 101 may be requested in the update to forward engine control messages to "port 2" rather than "port 1". In the event the supervisor module 207 determines this to comply with the rule-compliance criteria, then operation can continue, and the update can be accepted. However, suppose the CNC is compromised and the update instructs network node 101 to forward engine control messages to "port 3" instead of "port 1" wherein "port 3" is a communication channel to a telematics engine control unit. This would mean that potentially critical messages for the operation of the engine are not forwarded to the engine. The rule-compliance-criteria may specify that engine control messages must always be forwarded to the engine and therefore the supervisor may prevent such an update being accepted and the rule set may be left unchanged. In examples, where the rule-compliance-criteria comprises a first and second set, the first set of rule-compliance-criteria may specify that engine control messages may be sent to port 1 or port 2. The second set of rule-compliance-criteria may specify that engine control messages must be sent to at least one of port 1 or port 2 or at least one port (rather that not being forwarded at all).

As a further practical example of the operation of the network node we may assume that there is a network node failure. Accordingly, a virtual machine or functionality hosted by that network node must be moved to a different network node. Such a live migration of the virtual machine will result in the IP address of the virtual machine being seen in a different part of the network and associated with the MAC address of a different network node. Thus, the CNC 106 may provide an update that maps the IP address of the migrated virtual machine or functionality to a different network node address e.g. MAC address. In the event the supervisor module 207 determines this to comply with the rule-compliance criteria, then operation can continue, and the update can be accepted. In other examples, a compromised CNC may use such an update to redirect messages to an address of a further compromised device. Thus, the supervisor module 207 and the rule-compliance-criteria may limit the network node addresses, e.g. MAC address, that a particular IP address may be mapped to. Accordingly, a compromised CNC may not be able to cause the forwarding of messages to the further compromised device because the rule-compliance-criteria and supervisor module 207 may prevent the update being implemented at the network node 101.

Figure 5:
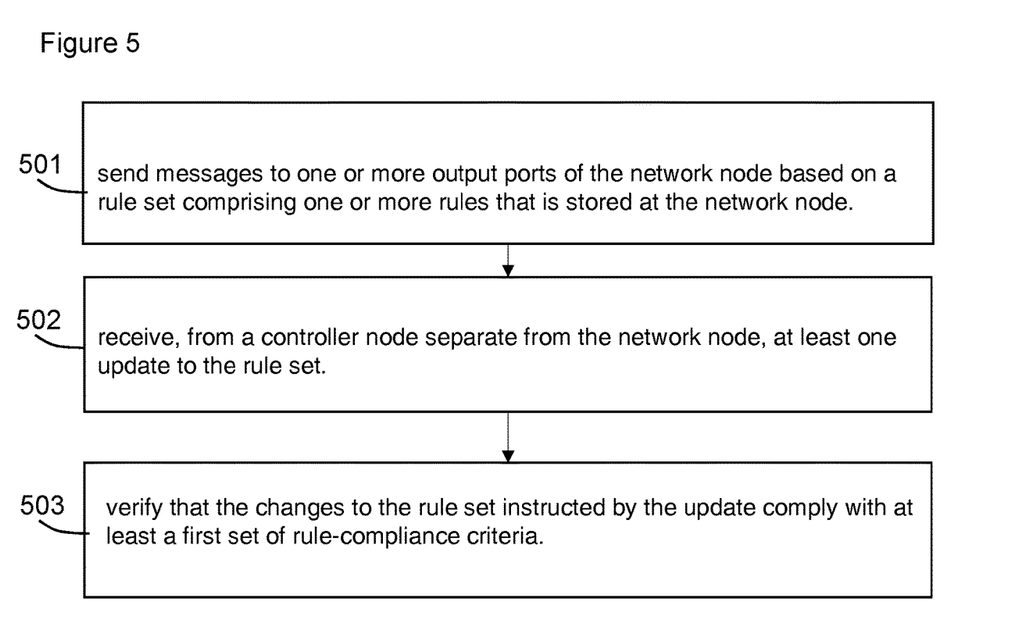
FIG. 5 shows a flowchart illustrating an example method.

FIG. 5 shows an example flowchart illustrating an example method. The method comprises controlling 501 the sending of messages to one or more output ports of the network node based on a rule set stored at the network node, the rule set comprising one or more rules; receiving 502 at least one update to the rule set from a controller node, separate from the network node, for changing the rule set; and verifying 503 that the changes to the rule set instructed by the update comply with at least a first set of rule-compliance-criteria and, if so, modifying the rule set to implement the changes of the update and, if not, not implementing the changes to the rule set.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A network node comprising:
   a message handling module configured to control the sending of messages to one or more output ports of the network node based on a rule set stored at the network node, the rule set comprising one or more rules;
   a communication module configured to receive at least one update to the rule set from a controller node, separate from the network node, for changing the rule set; and
   a supervisor module configured to verify whether the changes to the rule set instructed by the update comply with a first set of rule-compliance-criteria comprising criteria that must not be contravened and a second set of rule compliance criteria comprising criteria that must be met;
   wherein the network node is configured to modify the rule set to implement the changes of the update in response to determining that the changes in the rule set instructed by the update comply with the first set of rule-compliance criteria and the second set of rule compliance criteria;
   wherein the network node is configured not to implement the changes to the rule set in response to determining that the changes in the rule set instructed by the update do not comply with both of the first set of rule-compliance criteria and the second set of rule compliance criteria; and
   wherein the supervisor module is configured to verify whether the changes to the rule set instructed by the update comply with the first set of rule-compliance-criteria followed by the second set of rule-compliance-criteria or to verify whether the changes to the rule set instructed by the update comply with the second set of rule-compliance-criteria followed by the first set of rule-compliance-criteria.

2. A network node according to claim 1, wherein the communication module comprises a software defined networking, SDN, agent.

3. A network node according to claim 1, wherein the control of the sending of the one or more messages comprises one or more of:
   forwarding of one or more messages generated at the network node to at least one of the one or more output ports based on one or more forwarding rules of the rule set;
   forwarding of one or more messages received at one or more input ports of the network node to one of the one or more output ports based on one or more forwarding rules of the rule set;
   controlling flow of the one or more messages based on one or more bandwidth rules of the rule set;
   addressing of the one or more messages based on one or more addressing rules of the rule set;
   scheduling of the forwarding of the one or more messages based on one or more scheduling rules of the rule set; and
   controlling formatting or content of the one or more messages based on one or more modification rules.

4. A network node according to claim 1, wherein the rule set is exclusively determined by the controller node.

5. A network node according to claim 1, wherein the changes to the rule set defined by the update comprise:
   replacement of one or more of the rules of the rule set;
   addition to the rules of the rule set; and/or
   removal of one or more of the rules of the rule set.

6. A network node according to claim 1, wherein the communication module is configured to establish a secure communication channel between the network node and the controller node for the receipt of the at least one update to the rule set.

7. A network node according to claim 1, wherein the network node is configured to receive the rule-compliance-criteria by a process that verifies the authenticity of the rule-compliance-criteria.

8. A network node according to claim 1, wherein the first set of rule-compliance-criteria comprises criteria that defines where the one or more messages forwarded by the message handling module should not be sent.

9. A network node according to claim 1, wherein the second set of rule-compliance-criteria comprises criteria that defines where the one or more messages forwarded by the message handling module must be sent.

10. A network node according to claim 1, wherein based on determination that the changes to the rule set instructed by the update do not comply with the at least first set of rule-compliance-criteria, the network node is configured send a warning message indicative of the update not complying with the rule-compliance-criteria.

11. A network comprising:
    a controller node; and
    a plurality of network nodes, each network node comprising:
      a message handling module configured to control the sending of messages to one or more output ports of the network node based on a rule set stored at the network node, the rule set comprising one or more rules;
      a communication module configured to receive at least one update to the rule set from a controller node, separate from the network node, for changing the rule set; and a supervisor module configured to verify that the changes to the rule set instructed by the update comply with a first set of rule-compliance-criteria comprising criteria that must not be contravened and a second set of rule-compliance criteria comprising criteria that must be must be met;

wherein the network node is configured to modify the rule set to implement the changes of the update in response to determining that the changes to the rule set instructed by the update comply with the first set or rule-compliance criteria and the second set of rule-compliance criteria;

wherein the network node is configured not to implement the changes to the rule set in response to determining that that the changes to the rule set instructed by the update do not comply with both of the first set or rule-compliance criteria and the second set of rule-compliance criteria;

wherein the supervisor module of each network node is configured to verify whether the changes to the rule set instructed by the update comply with the first set of rule-compliance-criteria followed by the second set of rule-compliance-criteria or to verify whether the changes to the rule set instructed by the update comply with the second set of rule-compliance-criteria followed by the first set of rule-compliance-criteria; and wherein the output ports of each of network nodes provides a communication channel to another one of the plurality of network nodes or the controller node.

12. The network of claim 11, wherein the network comprises a network of an automobile and at least one of the plurality of network nodes comprise a driver assistance system.

13. An automobile comprising the network of claim 11.

* * * * *